(12) United States Patent
Garberg et al.

(10) Patent No.: US 7,195,155 B2
(45) Date of Patent: Mar. 27, 2007

(54) METHOD OF ADVERTISING AND DISPENSING PRODUCTS

(75) Inventors: Dennis D. Garberg, Overland Park, KS (US); Steve Kucharski, Olathe, KS (US); Jon Walker, Overland Park, KS (US); Mark J. Hunter, Omaha, NE (US)

(73) Assignee: Dennis Garberg & Associates, Inc., Overland Park, KS (US)

( * ) Notice: Subject to any disclaimer, the term of this patent is extended or adjusted under 35 U.S.C. 154(b) by 6 days.

(21) Appl. No.: 10/859,760

(22) Filed: Jun. 3, 2004

(65) Prior Publication Data

US 2004/0216339 A1 Nov. 4, 2004

Related U.S. Application Data

(62) Division of application No. 10/424,434, filed on Apr. 28, 2003, now Pat. No. 6,944,981.

(51) Int. Cl.
*G06K 7/01* (2006.01)

(52) U.S. Cl. .................... 235/383; 280/33.992; 40/308

(58) Field of Classification Search ................ 235/383, 235/381; 280/29, 33.993, 33.997, 642
See application file for complete search history.

(56) References Cited

U.S. PATENT DOCUMENTS

| | | | |
|---|---|---|---|
| 3,024,554 A | 3/1962 | Kempher | |
| 3,609,893 A | 10/1971 | Routzahn et al. | |
| 3,993,319 A | 11/1976 | Day | |
| 4,487,134 A * | 12/1984 | Foote | 280/33.992 |
| 4,616,839 A | 10/1986 | Trubiano | |
| 4,679,818 A * | 7/1987 | Kakavas | 280/33.992 |
| 5,004,252 A | 4/1991 | Kraper | |
| 5,158,310 A * | 10/1992 | Tannehill et al. | 280/33.992 |
| 5,306,033 A | 4/1994 | Evans | |
| 6,944,981 B1 * | 9/2005 | Garberg et al. | 40/308 |
| 2002/0083628 A1 | 7/2002 | Magid | |

FOREIGN PATENT DOCUMENTS

CA 2367757 * 4/2002

* cited by examiner

*Primary Examiner*—Daniel Stcyr
(74) *Attorney, Agent, or Firm*—Hovey Williams LLP

(57) ABSTRACT

A mobile dispensing display, method for conversion of shopping cart into dispensing display and a method of advertising and dispensing products involves the use of a conventional shopping cart. The shopping cart is provided from a store where the promotional activity is to be conducted and converted into a mobile dispensing display by mounting an advertising display onto the basket and mounting a product sample support panel on the shopping cart over the child seat. The mobile display may be moved intermittently to advantageous locations throughout the store where shoppers congregate. Product to be sold and/or sampled, as well as coupons or other promotional materials may be placed in the cart, whereby the cart becomes a mobile promotional and sales display as the user functions as a shoppers assistant providing information, samples or coupons. The user is not restricted to a single location, and may maintain personal and promotional items under direct supervision.

23 Claims, 3 Drawing Sheets

METHOD OF ADVERTISING AND DISPENSING PRODUCTS

RELATED APPLICATION

This application is a divisional of U.S. patent application Ser. No. 10/424,434, filed Apr. 28, 2003 now U.S. Pat. No. 6,944,981, incorporated by reference herein.

BACKGROUND OF THE INVENTION

1. Field of the Invention

This invention concerns a device which is a conversion of a shopping cart and which has particular usefulness in the distribution and advertising of sample and promotional items by an attendant in a retail environment. In addition, the present invention concerns a method of converting a shopping cart into a mobile dispensing display and a method of advertising and dispensing products in a retail environment.

2. Description of the Prior Art

Retail store shoppers in supermarkets use shopping carts which are pushed along aisles where the customer selects products from shelves, and then makes the final purchase at a checkout stand. The items are usually selected in a self-service environment by the shopper, collected in the mobile shopping cart, and then unloaded at the checkout stand where their prices are totaled and the purchase is made. Shoppers usually obtain a cart near the store entrance and then move through the supermarket to make their selections.

Product manufacturers often hire attendants to distribute samples and promotional material such as coupons to shoppers moving through the store in order to introduce them to a product and encourage the shopper to select the item being sampled. These attendants often purchase some of the product from the supermarket and then set up a fixed position display in one location in the store. These locations may be in remote or unfavorable locations within the store for encouraging shoppers to purchase the items, and the displays must be dismantled and moved at the end of the day, or even during the day of display depending on the needs of the supermarket operator. The attendant may also need to leave the display in order to replenish the products during the course of the day.

Accordingly, there has arisen a need for an improved device and method of displaying and distributing samples and promotional items in a retail environment where the products being promoted are sold.

SUMMARY OF THE INVENTION

The present invention uniquely meets these requirements by providing a mobile display which an attendant may use to circulate within a supermarket to an advantageous location as circumstances dictate. In addition, the invention includes a method for converting a shopping cart into a mobile sampling display, and a method of advertising products and dispensing samples and other promotional items. The present invention has significant advantages over the prior art fixed displays and the associated sampling distribution method in that the attendant may convert a shopping cart already on location at the retail store into a mobile display without the necessity of carrying a display into the store, may position the display at advantageous locations during the course of the time of the promotion or move away from areas of restocking or repair, may use the mobile display itself to collect additional products for sale, and may be more approachable to customers because the mobile display creates an atmosphere permitting the attendant to mingle with the shoppers more readily. For example, in contrast to fixed sampling displays usually located near the aisle or shelf where the product is displayed at retail, the mobile display of the present invention permits the attendant to position the display at concentrations of shoppers such as store entrances with a quantity of product available to deliver to the shopper. Advertising or signage is removably attached to the mobile display which permits ready conversion of any shopping cart in the store and which helps to call the shopper's attention to the mobile display. The purchase is not made at the mobile display, but rather at a checkout stand or other remote location, which aids in the sampling process so that the shopper receives a benefit at the mobile display and actually consummates the purchase remote from the mobile display.

The mobile display hereof includes a shopping cart having a basket and wheels which permit easy pushing of the display through a retail store such as a supermarket. Such shopping carts include an upper rim and a pushbar, and preferably a child seat with a backrest. A panel of a durable material such as wood or, more preferably, synthetic resin, is positioned over the child seat to rest on the upper rim and includes a slot for receiving an uppermost portion of the backrest therethrough. The slot and backrest cooperate with the upper rim and preferably a rear portion of the cart adjacent the pushbar to releasably hold the panel in position. The panel is particularly useful for the attendant in displaying and dispensing food and other product samples to shoppers, and may be used as a cutting surface for cutting food items into sample sizes. The panel has an additional benefit in covering and masking the child seat area so that the attendant may place a purse or other personal object therebeneath which inhibits pilfering when the attendant is occupied. The mobile display also preferably includes an advertising display which may be removably attached to the cart by coupling members such as threaded attachments, cable ties or most preferably wire twist ties. The advertising display may most preferably be provided as a flexible skirt of synthetic resin sheeting which is lightweight and readily attached and removed by the use of the coupling members. The mobile display may also optionally include an insulating carrier within the basket of the cart which may hold a phase change material such as dry ice or conventional ice to maintain product in a relatively cold condition until dispensed. The insulating carrier may also be used to maintain an elevated temperature relative to the ambient temperature within the store for warm items to be sampled. Items, such as sample products, coupons or promotional literature may be retained in the basket of the shopping cart until provided to the shoppers.

The invention hereof also includes a method of converting a shopping cart into a mobile display. The method includes the steps of providing a shopping cart as described above, removably mounting an advertising display to the basket of the cart in a manner that indicia on the display is oriented away from the interior of the basket portion of the cart, and removably mounting a panel in a substantially horizontal orientation on the cart in substantially covering relationship to the child seat area. The mounting step for the panel preferably includes positioning the panel so that an uppermost part of a backrest portion of the child seat of the cart extends through a slot in the panel for restricting movement of the panel in a direction coplanar with the panel. The method of converting may also include placement of saleable items into the basket whereby the mobile display is configured to permit dispensing of both items displayed on the panel as samples and saleable items from the basket.

Furthermore, the invention hereof includes a method of advertising and dispensing products. A mobile display is preferably provided which includes an advertising display removably coupled to a shopping cart together with promotional items such as samples and preferably products received within the basket of the shopping cart for distribution by an attendant. The method includes intermittently moving the mobile display within a retail store and intermittently providing shoppers within the retail store with promotional items from the mobile display. The step may also include moving the mobile display to and temporarily maintaining the mobile display at selected locations of customer concentration within the retail store. The method may preferably include periodically restocking the mobile display with saleable products displayed in stationary displays and then resuming movement of the mobile display within the store. The method may further include the step of maintaining the temperature of sampled items at a temperature which is above or below the ambient.

From the foregoing, it may be appreciated that the invention hereof provides a distinct advantage over static product displays or sampling displays which are relatively statically located. The attendant may actively seek out advantageous locations within a retail environment while being able to move to new locations as a result of overcrowding or dispersion of shoppers. The attendant need carry only a minimal amount of items into the store in order to convert a conventional shopping cart into a mobile display. Furthermore, the mobile display not only includes an advertising display, but also facilitates display and dispensing of the samples from the panel and a readily movable product retainer from which the saleable items may be distributed by the attendant.

These and other objects will be readily appreciated by those skilled in the art with reference to the drawings and description which follow.

DESCRIPTION OF THE PREFERRED EMBODIMENT

Figure 1:
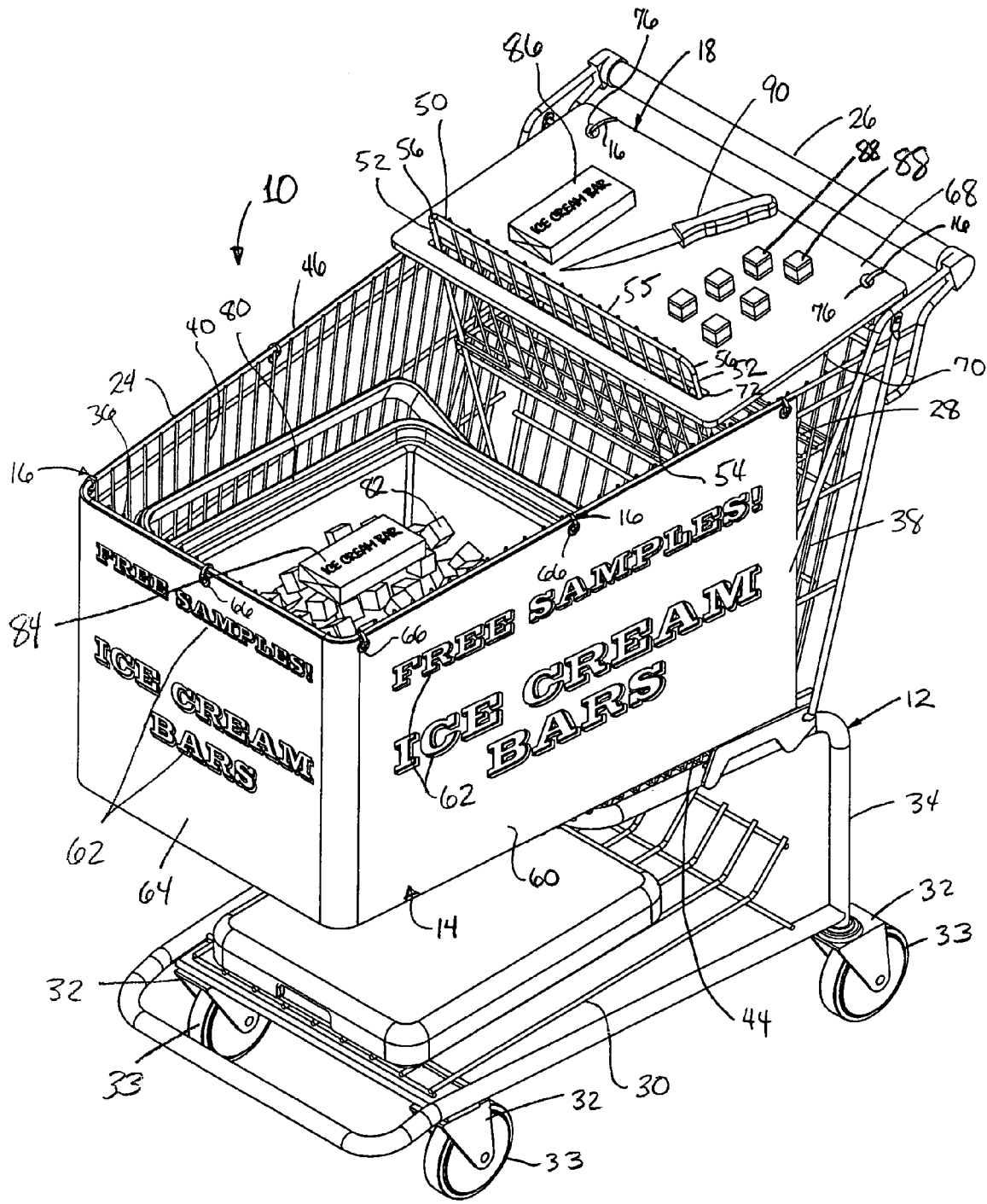
FIG. 1 is a front left perspective view of a first embodiment of the apparatus of the present invention, showing a shopping cart having a basket and a child seat with an advertising display coupled to the basket and a product support panel supported by the cart in overlying relationship to the child seat.
Figure 3:
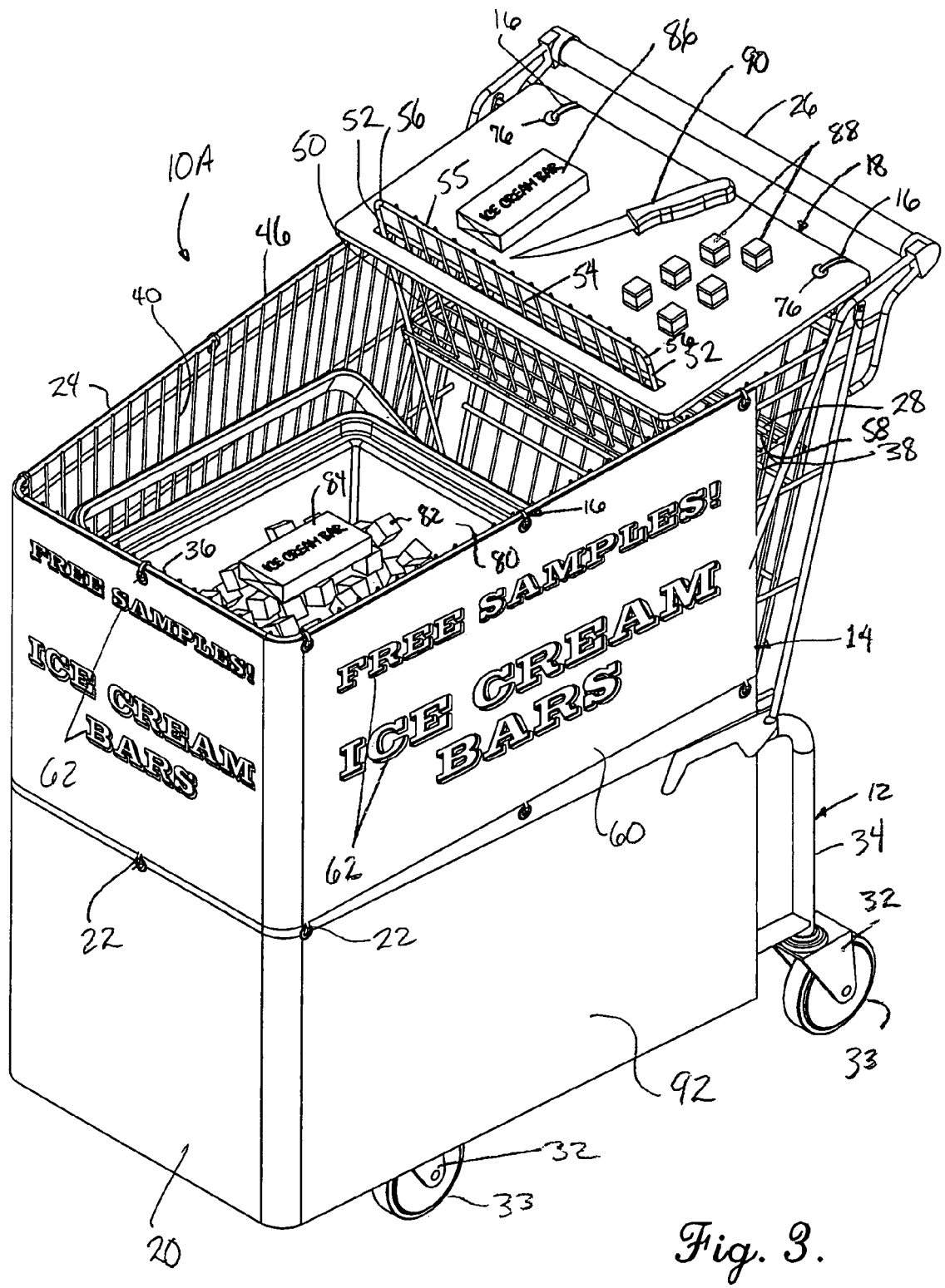
FIG. 3 is a front left perspective view of a second embodiment of the apparatus of the present invention wherein a skirt is coupled to the basket to partially enclose the region between the basket and the bottom rack of the shopping cart.

Referring now to the drawings, a mobile dispensing display 10 in accordance with the present invention as shown in FIG. 1 broadly includes a shopping cart 12, a advertising display 14 mounted on the shopping cart 12, coupling members 16 for mounting the display 14 to the shopping cart 12, and a product sample support panel 18 supported on the shopping cart. A modified dispensing display 10a as shown in FIG. 3 may further include a skirt 20 which is coupled to the shopping cart 12 by attachments 22.

In greater detail, the shopping cart 12 hereof may be of any one of a variety of types and styles as used by shoppers in supermarkets, such as the conventional forward cantilever nesting variety as shown in the drawing figures hereof, or may be of the less common side cantilever design as shown, for example, in U.S. Pat. No. 3,052,319, the disclosure of which is incorporated herein by reference. Such shopping carts 12 typically include a basket 24 for receiving items selected for purchase, a handle 26 for pushing the cart 12, a child seat 28 for permitting a small child to sit facing the handle 26, a bottom rack 30 positioned below the basket for receiving items thereon, a plurality of wheel assemblies 32 including wheels 33, and a pair of upright stanchions 34 for supporting the basket 24 above the bottom rack 30. The basket 24 typically is provided of wires joined by welding, brazing or the like into grid-like wall structures which include a front wall 36, side walls 38 and 40, a rear wall 42 and a base wall 44, with an upper rim 46 of a metal bar material defining an opening 48 to permit loading and unloading of items into the basket 24.

Figure 2:
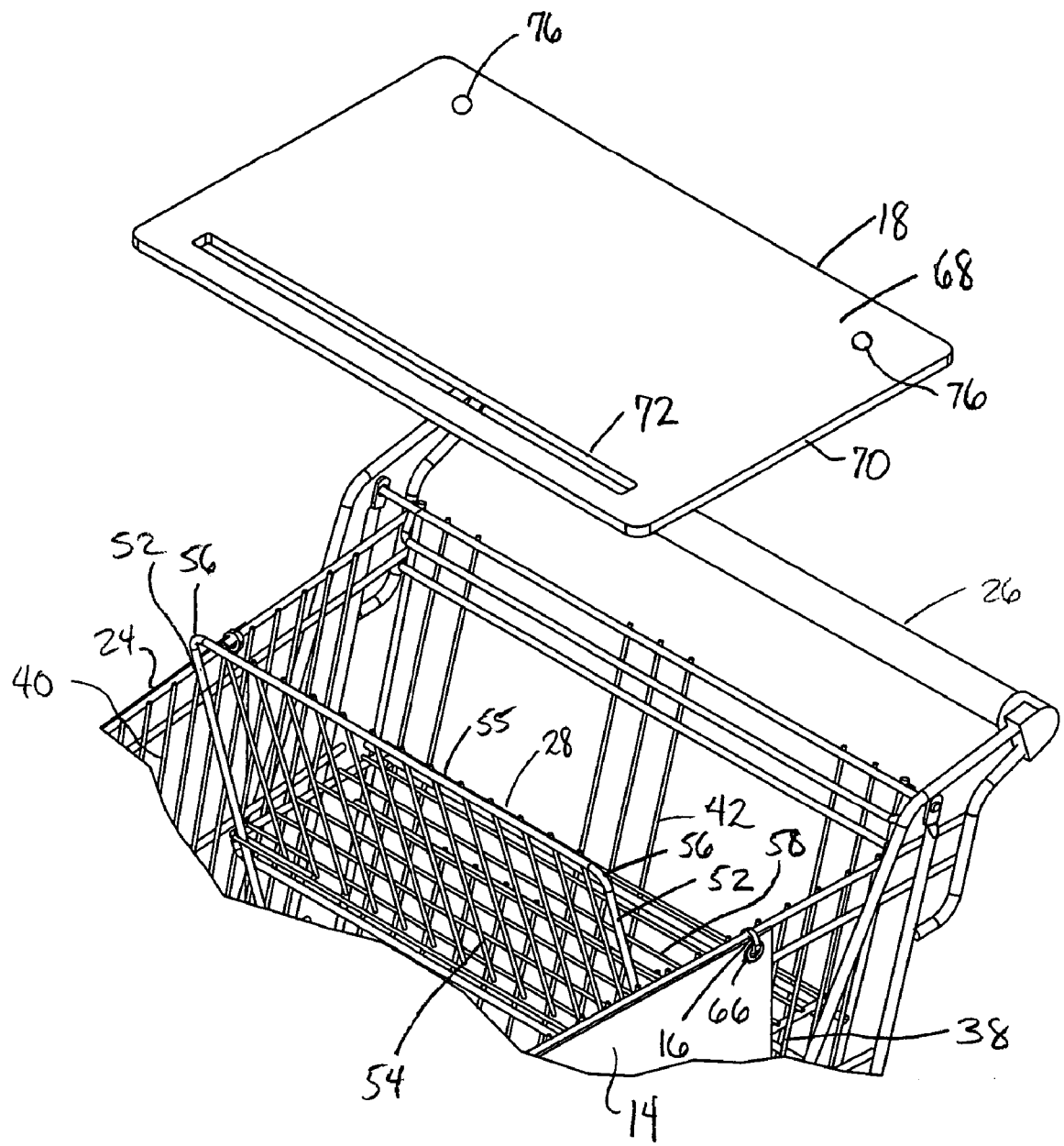
FIG. 2 is an enlarged fragmentary exploded perspective view similar to FIG. 1 showing the product support panel removed from the shopping cart.

The handle 26 is typically positioned extending rearwardly of the basket 24 when in use, whereby a user may push the cart 12 by grasping the handle 26. The child seat 28 is typically provided by a backrest 50 including a pair of arms 52 pivotally mounted to the basket 24 and a support grid 54 including a bridge 55 extending across the upper ends 56 of the arms 52. The bridge 55 and upper ends 56 of the arms 52 typically extend vertically above the upper rim 46 of the basket as shown in FIGS. 1, 2 and 3. The child seat 28 also includes a seat support 58 which is pivotally coupled to the backrest 50 and mounted for vertical sliding on the rear wall 42 of the basket 24. Thus, it is possible to shift the backrest 50 rearwardly, whereby the seat support 58 swings upwardly to lie substantially flat with and against the rear wall 42 and the forward support. The bottom rack 30 lies beneath the base wall 44 and permits the shopping cart 12 to carry additional items thereon.

The foregoing description generally describes the shopping carts 12 which are entirely conventional and well known to supermarket shoppers.

Such shopping carts 12 may be readily converted into the mobile dispensing displays 10 of the present invention by the use of a relatively few inexpensive additions. The advertising display 14 is preferably an elongated sheet 60 of imprintable material such as paper, cloth or synthetic resin. The sheet 60 includes indicia 62 printed on at least the exterior facing side 64 thereof, the indicia 62 preferably corresponding to the product or samples to be dispensed. While the sheet 60 may be of various sizes and can be provided in one, two, three or more separate sections, it is most preferably dimensioned of a length sufficient to substantially wrap around the basket 24 from a location on the side wall 38 proximate the rear wall 42, forwardly along the side wall 38, and across the front wall 36, and rearwardly along side wall 40 to a location again proximate the rear wall 42. Further, the sheet 60 is most preferably dimensioned to extend from the upper rim 46 to the base wall 44 to provide a more attractive appearance to the mobile dispensing display 10 and to focus the attention of shoppers on the advertising and the products displayed on the sample support panel 18. The advertising display 14 preferably includes grommets 66 or the like to facilitate mounting the display 14 to the shopping cart 12.

A variety of different coupling member 16 may be employed for mounting the advertising display 14 to the shopping cart 12. String, cable ties, threaded fasteners and wire twist ties are lightweight, small, inexpensive and easy to use and for these reasons are among the preferred couplers 16. However, it may be understood that adhesive, hooks, toggles, snap loops, hook and loop fasteners, magnetic strips and many other couplers may be used to attach the advertising display to the shopping cart 12.

The product sample support panel 18 is preferably of a synthetic resin material such as nylon or high molecular weight polyethylene, but it may be appreciated that wood or metal panels 18 may also be employed. The product sample support panel 18 preferably is a substantially planar member 68 which is substantially rigid so as to substantially retain its shape in spanning across the shopping cart 12 between the walls 38 and 40, and thus the width of the panel 18 is typically about 23 inches. The use of a synthetic resin material facilitates cleaning the panel 18 when used for cutting slices of product to be sampled. As may be seen in the drawing figures, the panel 18 is most preferably rectangular in configuration or may be slightly inwardly tapering along parts of the side wall towards the rear end adjacent the handle 26. The front to rear depth of the panel may conveniently be about 13" for compatibility with most shopping carts. The panel 18 is provided with a surrounding margin 70 and an opening such as transverse slot 72. The slot 72 is positioned interiorly of and preferably not in communication with the surrounding margin, and is sized complementally to the backrest 50 of the child seat 28, such that the slot 72 is typically about 18" inches in width to accommodate most backrests 50. The slot 72 is sized to receive the upper ends 56 of the arms 52 and at least a part of the support grid 54 such as bridge 55 therethrough as shown in FIGS. 1 and 3, but is only slightly larger than the thickness and width of the backrest 50 so that the panel 18 is constrained against significant side-to-side or front and rearward movement. The panel 18 is sized to be supported on the upper edge 74 of the rear wall 42 and the upper rim 46 when the forward support passes through the slot 72 in an operational configuration, whereby the panel may be level or slightly inclined. Advantageously, this construction avoids the need for separate fasteners to hold the panel 18 in position, which facilitates its transportation, mounting and removal. However, coupling members 16 may also be used if desired to further fasten the panel 18 to the shopping cart 12; for example, the coupling members 16 may pass through the slot 72 and around the edge 70 to secure the panel 18 to the backrest 50, or holes 76 may be bored through the thickness of the panel 18 in a location proximate the side walls 38 and 40 of the basket 24 when the panel is in a mounted position and coupling members 16 such as string, cable ties, wire twist ties or a threaded fastener may be used to further secure the panel 18 to the shopping cart 12. Such coupling members 16 still permit rapid placement and removal of the panel.

In addition, the mobile dispensing display hereof may include devices for maintaining the temperature of sample products received in the basket 24 at a desired serving temperature. Mobile heating or cooling devices may be placed in the basket 24, from which products to be distributed can be retrieved by the user. For example, an insulating carrier 80 may be placed in the basket 24, and a phase change material such as ice 82 or a reusable packaged refrigerant may be placed in the insulating carrier 80. Packages 84 of sample product 86 may be stored in the insulating carrier 80 until use is desired. For example, if ice cream bars are to be distributed for sampling, the packages 84 containing multiple ice cream bars may be retained in the insulating carrier and maintained at a temperature below ambient temperature until ready for use. Individual ice cream bars might then be removed from the packages. The basket 24 could also hold napkins, plates, cups or other items necessary for effectively distributing the sample products 86. The sample products 86 can be cut into individual sampling portions 88 on the panel 18 using a knife 90 and then distributed manually to the potential customers by the user.

In the modified mobile dispensing display 10*a* of FIG. 3, all of the components and operations are the same as with the dispensing display 10, but wherein the skirt 20 is added to further at least partially enclose the area beneath the basket 24 and above the bottom rack 30. The skirt 20 may be of cloth, paper or other material, and may be planar, corrugated, pleated or otherwise formed. Attachments 22 of cable ties, string, wire twist ties or other materials may be employed to removably attach the skirt 20. The skirt may also receive indicia on the outer surface 92 thereof if a greater advertising display surface is desired.

Beneficially, the advertising display 14, couplers 16, sample product support panel 18, skirt 20 and attachments 22 are both lightweight, easy to transport, and quickly mounted to a shopping cart 12 of conventional design without the necessity of tools. Thus, the conversion of the shopping cart 12 to the mobile dispensing display 10 can be quickly an easily accomplished by an individual without the need for tools. For example, the advertising display 14 may be folded until the time of use, mounted to the basket by twist ties or string, and the sample product support panel may be lowered into position without the need for fasteners in only a few moments, and then removed just as easily. Attachment of the skirt 20 is similarly accomplished. Moreover, the mobile dispensing display 10 has as its most expensive and complicated component a conventional shopping cart 12 which can be used for merchandising and then returned to its more conventional employment without any permanent alterations or degradation in capability. Another benefit of the mobile dispensing display 10 hereof is that the shopping cart facilitates mobility, the basket 24 provides a convenient and readily accessible storage area for products to be sold or distributed in sampling, the advertising display 14 attracts attention, and the panel 18 provides both a convenient surface for cutting products such as fruit, vegetables, and prepared foods into individual sample portions or supporting small cups or the like for distribution, but offers the user the benefit of covering any personal items which may be placed on the child seat 28 beneath the panel 18.

The invention hereof also includes the novel method of advertising and dispensing a product within a store such as a supermarket or department store where shoppers view and purchase various products typically at a checkout stand having a cash register, credit or debit card terminal or a similar device for recording and/or processing purchase transactions. By providing the shopping cart 12 and locating it at a desired location within the store, the user may readily place product in the basket 24 and manually distribute the product to shoppers within the store. The preferred method includes first converting the shopping cart 12 to the mobile dispensing display by mounting the advertising display 14 on the shopping cart 12 so that the indicia are readily visible and/or placing the product support panel 18 over the backrest of the child seat 28 as shown in the drawings. Additionally, the insulating carrier 80 may be placed in the basket 24. A phase change material may be placed in the insulating carrier 80, and products 86 may be placed in the insulating carrier and maintained at a colder or warmer temperature than the ambient temperature in the store. The user functions as a shoppers assistant to explain the product, distribute samples, and may either distribute products directly from the basket 24 or direct shoppers to a location in the store where they are displayed. Typically, the user will purchase products used for distributing samples from the store, but can also distribute products for sale directly from the basket. When the products in the basket are depleted, the user can move the display 10 to the area where they are displayed and restock the basket, all without leaving the display 10, or after retrieving additional products for sampling, move the display to the checkout stand to purchase additional products for sampling.

Advantageously, the user may move freely about the store to position the display most advantageously as sales circumstances dictate. For example, the mobile display 10 might be initially positioned near an entrance to the store, near the checkout stand, or near the location in the store where the products are routinely displayed for sale, and then move to other locations to present the products to areas where shoppers are concentrated, or move away from points of congestion. By using the shopping cart 12 as a part of the display with the advertising display 14 attached, the user readily attracts attention of the shoppers within the store to the products to which the display is directed. The use of the product support panel 18 permits the user to cut products into sample sizes and place them on napkins, cups or other product receivers so that the individual sample portions can be manually dispensed. By having product packages in the basket 24, once the shoppers sample and approve of the sample portions, they may be provided with the product packages for purchase directly from the mobile display. The user may verbally discuss the products, distribute coupons or additional product information held in the basket 24 or displayed on the panel 18, or provide other information to promote the products or complementary products available within the store. Moreover, this can be accomplished while the user moves the mobile display 10 within the store and does not require a stationary presence. The user can retain all of his or her product promotional materials or personal items in the basket, and these can be maintained in the child seat 28 below the panel 18 out of sight of the shoppers. The method of the present invention thus permits the user to mingle with the shoppers, move to advantageous areas within the store, draw attention to the products being promoted, distribute promotional samples and/or coupons, and retain his or her promotional materials and personal items under direct supervision while maintaining full mobility to move throughout the store.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. A method of advertising and distributing a product within a store in which shoppers view and purchase various products including the product, said product advertising and dispensing method comprising the steps of:
    (a) providing a mobile product display, wherein the mobile product display comprises a shopping cart including a basket and a child seat supported on a plurality of wheels;
    (b) placing a supply of the product within the basket;
    (c) locating the mobile product display at a first location within the store;
    (d) manually distributing promotional items from the mobile product display to shoppers at said first location;
    (e) making available for distribution to shoppers at least one of said products from said supply within said basket; and
    (f) moving the mobile product display to a second location within the store and repeating steps (d) and (e), wherein steps (d) and (f) are performed by an attendant for the mobile product display.

2. The product advertising and dispensing method as claimed in claim 1,
    including the step of mounting to the basket an advertising display bearing product indicia about the product, and
    also including the step of orienting the advertising display on the basket so that the product indicia is oriented away from the interior of the basket.

3. The product advertising and dispensing method as claimed in claim 2,
    including the step of supporting on the shopping cart a product sample support panel in a substantially covering relationship to the child seat and positioning the panel to provide access by shoppers to the supply of products within the basket without moving the panel.

4. The product advertising and dispensing method as claimed in claim 3,
    including the step of receiving a backrest of the child seat within a complemental opening defined in the panel.

5. The product advertising and dispensing method as claimed in claim 4,
    including the step of resting the panel on an upper rim of the basket.

6. The product advertising and dispensing method as claimed in claim 5,
    including the step of fastening the panel to the shopping cart with at least one coupling member.

7. The product advertising and dispensing method as claimed in claim 6,
    wherein the step of moving the mobile product display to a second location includes the step of intermittently moving the mobile display to various locations within the store.

8. The product advertising and dispensing method as claimed in claim 7,
    wherein the step of moving the mobile product display to a second location within the store includes temporarily maintaining the mobile display at selected locations of customer concentration within the store.

9. The product advertising and dispensing method as claimed in claim 1,
    including the step of maintaining the product within the basket at a temperature which is above or below ambient temperature.

10. The product advertising and dispensing method as claimed in claim 9, including the steps of placing an insulating carrier within the basket and wherein step (b) includes storing the product within the insulating carrier.

11. The product advertising and dispensing method as claimed in claim 10,
step (c) including the step of placing a phase change material within the insulating carrier.

12. The product advertising and dispensing method as claimed in claim 11,
including the step of maintaining samples of the at least one product for distribution to shoppers at a temperature which is above or below ambient.

13. The product advertising and dispensing method as claimed in claim 1; wherein said step of making product available to shoppers includes the step of dispensing saleable units of the product from the basket to shoppers.

14. The product advertising and dispensing method as claimed in claim 1; and
restocking the supply of the product in the basket with the product.

15. The product advertising and dispensing method as claimed in claim 14,
said restocking step including the steps of moving the mobile display to a stationary store display for the product and replenishing the basket with product from the stationary display.

16. The product advertising and dispensing method as claimed in claim 1,
including the step of providing shoppers with information concerning the product, said providing of information being performed by the attendant.

17. The product advertising and dispensing method as claimed in claim 16,
including the steps of mounting to the basket an advertising display bearing product indicia about the product and
orienting the advertising display on the basket so that the product indicia is oriented away from the interior of the basket.

18. The product advertising and dispensing method as claimed in claim 1,
including the step of supporting on the shopping cart a product sample support panel in a substantially covering relationship to the child seat and
step (d) including the step of placing the samples on the support panel.

19. The product advertising and dispensing method as claimed in claim 1,
step (d) including the step of distributing coupons for the product to shoppers.

20. The product advertising and dispensing method as claimed in claim 1,
step (d) being performed while the mobile product display is being moved by the attendant.

21. The product advertising and dispensing method as claimed in claim 20,
step (d) including the step of distributing coupons for the product to shoppers.

22. The product advertising and dispensing method as claimed in claim 21,
including the step of providing shoppers with information concerning the product, said providing of information being performed by the attendant.

23. The product advertising and dispensing method as claimed in claim 22,
the providing of information being performed while the mobile product display is being moved by the attendant.

* * * * *